US011988735B2

(12) United States Patent
Srinivas et al.

(10) Patent No.: US 11,988,735 B2
(45) Date of Patent: May 21, 2024

(54) POSITION INFORMATION ESTIMATION IN A DISTRIBUTED RADIO FREQUENCY (RF) COMMUNICATIONS SYSTEM

(71) Applicants: Sharanya Srinivas, Tempe, AZ (US); Andrew Herschfelt, Phoenix, AZ (US); Daniel W. Bliss, Scottsdale, AZ (US)

(72) Inventors: Sharanya Srinivas, Tempe, AZ (US); Andrew Herschfelt, Phoenix, AZ (US); Daniel W. Bliss, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 214 days.

(21) Appl. No.: 17/089,074

(22) Filed: Nov. 4, 2020

(65) Prior Publication Data
US 2021/0132177 A1 May 6, 2021

Related U.S. Application Data

(60) Provisional application No. 62/930,232, filed on Nov. 4, 2019.

(51) Int. Cl.
*G01S 11/08* (2006.01)
*G01S 5/00* (2006.01)
(Continued)

(52) U.S. Cl.
CPC ............. *G01S 11/08* (2013.01); *G01S 5/0036* (2013.01); *G01S 5/0284* (2013.01);
(Continued)

(58) Field of Classification Search
CPC ........ G01S 11/08; G01S 11/02; G01S 5/0036; G01S 5/0289; G01S 5/0284; H04W 64/00
(Continued)

(56) References Cited

U.S. PATENT DOCUMENTS 4,648,099 A * 3/1987 Kerr .................... H04L 27/2014
332/101
5,510,800 A 4/1996 McEwan
(Continued)

FOREIGN PATENT DOCUMENTS

| CA | 2298812 A1 | 1/2000 |
| EP | 2137547 B1 | 3/2008 |
| KR | 20120010708 A | 2/2012 |

OTHER PUBLICATIONS

Non-Final Office Action for U.S. Appl. No. 16/787,300, mailed May 12, 2021, 9 pages.
(Continued)

*Primary Examiner* — Bo Fan
(74) *Attorney, Agent, or Firm* — Withrow & Terranova, P.L.L.C.

(57) ABSTRACT

Position information estimation in a distributed radio frequency (RF) communications system is provided. Embodiments disclosed herein facilitate high-precision estimations of positions, orientations, velocities, and acceleration of network nodes in a distributed RF network (e.g., including base stations and vehicles, such as aircraft or unmanned aerial systems (UASs)). Modern radio systems must adapt to limited spectral access by reducing spectrum demand and increasing operational efficiency. In this regard, an RF system is provided which simultaneously performs positioning and communications tasks. This system specifically addresses the issue of spectral congestion by employing an extremely efficient positioning strategy and using a joint waveform that simultaneously enables both tasks. This efficiency in turn supports more users in a given frequency allocation.

26 Claims, 10 Drawing Sheets

(51) Int. Cl.
    *G01S 5/02*        (2010.01)
    *H04B 7/185*     (2006.01)
    *H04L 5/14*      (2006.01)

(52) U.S. Cl.
    CPC ........ *G01S 5/0289* (2013.01); *H04B 7/18506* (2013.01); *H04L 5/143* (2013.01)

(58) Field of Classification Search
    USPC ............. 342/367, 357.52, 378; 375/150, 343
    See application file for complete search history.

(56) References Cited

U.S. PATENT DOCUMENTS

| | | | |
|---|---|---|---|
| 5,592,181 | A | 1/1997 | Cai et al. |
| 6,204,812 | B1 | 3/2001 | Fattouche |
| 6,421,330 | B1 | 7/2002 | Chung et al. |
| 6,611,234 | B2 | 8/2003 | Fullerton et al. |
| 6,687,507 | B2* | 2/2004 | Fischer ............... H04L 27/0012 375/150 |
| 7,173,919 | B1 | 2/2007 | Dabak |
| 7,286,624 | B2* | 10/2007 | Woo ........................ G01S 5/14 455/456.1 |
| 7,639,730 | B2* | 12/2009 | Rasmussen .......... H04B 1/7085 375/150 |
| 7,710,321 | B2* | 5/2010 | Heidari-Bateni ..... G01S 13/767 370/252 |
| 8,184,504 | B2 | 5/2012 | Altman et al. |
| 8,253,627 | B1 | 8/2012 | Burgess |
| 8,442,172 | B1 | 5/2013 | Dokania et al. |
| 9,019,159 | B2* | 4/2015 | Van Puijenbroek .. G01S 5/0218 342/442 |
| 9,060,342 | B2 | 6/2015 | Wu |
| 9,196,164 | B1 | 11/2015 | Urmson et al. |
| 9,756,599 | B2* | 9/2017 | Fischer .................... H04B 7/04 |
| 9,774,996 | B1* | 9/2017 | Frydman ................... G01S 5/10 |
| 9,883,348 | B1* | 1/2018 | Walker .................. H04W 4/029 |
| 10,681,669 | B2* | 6/2020 | Priyanto ............... H04L 5/0048 |
| 2003/0080902 | A1* | 5/2003 | Roberts ................. H04J 3/0682 342/125 |
| 2005/0047427 | A1 | 3/2005 | Kashima et al. |
| 2007/0109188 | A1 | 5/2007 | Zimmerman et al. |
| 2008/0165059 | A1* | 7/2008 | Karr ...................... G01S 13/765 342/378 |
| 2009/0285339 | A1 | 11/2009 | Zhang et al. |
| 2010/0226454 | A1* | 9/2010 | Bliss ................... H04L 27/2675 375/267 |
| 2010/0271263 | A1 | 10/2010 | Moshfeghi |
| 2010/0273506 | A1* | 10/2010 | Stern-Berkowitz ......................... H04L 5/0048 455/456.1 |
| 2010/0304708 | A1* | 12/2010 | McCrady .............. G01S 5/0221 375/343 |
| 2011/0158200 | A1* | 6/2011 | Bachu ................... H04L 5/0007 370/330 |
| 2012/0026041 | A1 | 2/2012 | Murdock et al. |
| 2012/0169542 | A1 | 7/2012 | Mathews et al. |
| 2013/0184011 | A1 | 7/2013 | Kaushansky |
| 2013/0285856 | A1* | 10/2013 | Opshaug .................... G01S 5/14 342/464 |
| 2014/0105054 | A1 | 4/2014 | Saegrov et al. |
| 2014/0186037 | A1 | 7/2014 | Dahlfort et al. |
| 2015/0282112 | A1 | 10/2015 | Bialer et al. |
| 2016/0252624 | A1* | 9/2016 | MacCurdy ............. G01S 19/14 342/357.52 |
| 2016/0302165 | A1 | 10/2016 | Da et al. |
| 2017/0003376 | A1 | 1/2017 | Wellman et al. |
| 2017/0367065 | A1 | 12/2017 | Seth et al. |
| 2019/0200164 | A1* | 6/2019 | Sanderovich ......... G01S 5/0247 |
| 2020/0260225 | A1 | 8/2020 | Herschfelt et al. |
| 2020/0319330 | A1 | 10/2020 | Bliss |
| 2021/0132182 | A1 | 5/2021 | Srinivas et al. |

OTHER PUBLICATIONS

Bidigare, P. et al., "Attaining Fundamental Bounds on Timing Synchronization," 2012 IEEE International Conference on Acoustics, Speech and Signal Processing (ICASSP 2012), Mar. 25-30, 2012, Kyoto, Japan, IEEE, pp. 5229-5232.

Bidigare, P. et al., "Initial Over-the-Air Performance Assessment of Ranging and Clock Synchronization Using Radio Frequency Signal Exchange," 2012 IEEE Statistical Signal Processing Workshop (SSP), Aug. 5-8, 2012, Ann Arbor, MI, IEEE, pp. 273-276.

Bliss, D. et al., "Adaptive Wireless Communications: MIMO Channels and Networks," 2013, Cambridge University Press, 619 pages.

Busse, F.D. et al., "Demonstration of Adaptive Extended Kalman Filter for Low-Earth-Orbit Formation Estimation Using CDGPS," Navigation: Journal of the Institute of Navigation, vol. 50, No. 2, Summer 2003, pp. 79-93.

Denis, B. et al., "Joint Distributed Synchronization and Positioning in UWB Ad Hoc Networks Using TOA," IEEE Transactions on Microwave Theory and Techniques, vol. 54, No. 4, Apr. 2006, IEEE, pp. 1896-1911.

Guvenc, I. et al., "A Survey on TOA Based Wireless Localization and NLOS Mitigation Techniques," IEEE Communications Surveys & Tutorials, vol. 11, No. 3, Third Quarter 2009, IEEE, pp. 107-124.

Kay, S.M., "Fundamentals of Statistical Signal Processing, vol. I: Estimation Theory," 1993, Prentice Hall, 303 pages.

Kim, H., "Double-Sided Two-Way Ranging Algorithm to Reduce Ranging Time," IEEE Communications Letters, vol. 13, No. 7, Jul. 2009, IEEE, pp. 486-488.

Lanzisera, S. et al., "Radio Frequency Time-of-Flight Distance Measurement for Low-Cost Wireless Sensor Localization," IEEE Sensors Journal, vol. 11, No. 3, Mar. 2011, IEEE, pp. 837-845.

Li, Q. et al., "Global Clock Synchronizationin Sensor Networks," IEEE Transactions on Computers, vol. 55, No. 2, Feb. 2006, IEEE, pp. 214-226.

Li, X.R. et al., "Survey of ManeuveringTarget Tracking. Part I: Dynamic Models," IEEE Transactions on Aerospace and Electronic Systems, vol. 34, No. 4, Oct. 2003, IEEE, pp. 1333-1364.

Liu, H. et al., "Survey of Wireless Indoor Positioning Techniques and Systems," IEEE Transactions on Systems, Man, and Cybernetics-Part C: Applications and Reviews, vol. 37, No. 6, Nov. 2007, IEEE, pp. 1067-1080.

Mills, D.L. et al., "Internet Time Synchronization: The Network Time Protocol," IEEE Transactions on Communications, vol. 39, No. 10, Oct. 1991, IEEE, pp. 1482-1493.

Mills, D.L., "Network Time Protocol (Version 3) Specification, Implementation and Analysis," Network Working Group, Request for Comments: 1305, Mar. 1992, 120 pages.

Oh, D.- G., "A Novel Time Delay Estimation Using Chirp Signals Robust to Sampling Frequency Offset for a Ranging System," IEEE Communications Letters, vol. 14, No. 5, May 2010, IEEE, pp. 450-452.

Paul, B. et al., "Survey of RF Communications and Sensing Convergence Research," Survey of RF Communications and Sensing Convergence Research, vol. 5, 2017, IEEE, 20 pages.

Pelka, M. et al., "Evaluation of time-based ranging methods: Does the choice matter?," 2017 14th Workshop on Positioning, Navigation and Communications (WPNC), Oct. 25-26, 2017, Bremen, IEEE, 6 pages.

Sundararaman, B. et al., "Clock synchronization for wireless sensor networks: a survey," Ad Hoc Networks, vol. 3, Issue 3, 2005, Elsevier B.V., pp. 281-323.

Zucca, C. et al., "The Clock Model and Its Relationship with the Allan and Related Variances," IEEE Transactions on Ultrasonics, Ferroelectrics, and Frequency Control, vol. 52, No. 2, Feb. 2005, IEEE, pp. 289-296.

International Search Report and Written Opinion for International Patent Application No. PCT/US2018/066763, mailed Apr. 29, 2019, 10 pages.

(56) References Cited

OTHER PUBLICATIONS

International Preliminary Report on Patentability for International Patent Application No. PCT/US2018/066763, mailed Jul. 2, 2020, 7 pages.
Bliss, D., "Cooperative radar and communications signaling: The estimation and information theory odd couple," 2014 IEEE Radar Conference, May 19-23, 2014, Cincinnati, OH, USA, IEEE, 6 pages.
Brown III, D.R. et al., "Non-Hierarchical Clock Synchronization for Wireless Sensor Networks," arXiv:1212.1216v1 [nlin.AO], Dec. 6, 2012, 8 pages.
Chiriyath, A. et al., "Inner Bounds on Performance of Radar and Communications Co-Existence," IEEE Transactions on Signal Processing, vol. 64, Issue 2, Sep. 2015, IEEE, pp. 464-474.
Chiriyath, A.R. et al., "Joint radar-communications performance bounds: Data versus estimation information rates," MILCOM 2015-2015 IEEE Military Communications Conference, Oct. 26-28, 2015, Tampa, FL, USA, IEEE, 6 pages.
Chiriyath, A. et al., "Radar-Communications Convergence: Coexistence, Cooperation, and Co-Design," IEEE Transactions on Cognitive Communications and Networking, vol. 3, No. 1, Feb. 2017, IEEE, 13 pages.
Gelb, A., "Applied optimal estimation," MIT press, Apr. 1974, 192 pages.
Gutierrez, R. et al., "Joint radar-communications system implementation using software defined radios: Feasibility and results," 2017 51st Asilomar Conference on Signals, Systems, and Computers, Oct. 29-Nov. 1, 2017, Pacific Grove, CA, USA, IEEE, 6 pages.
Herschfelt, A., "Simultaneous Positioning and Communications:Hybrid Radio Architecture, Estimation Techniques, and Experimental Validation," A Dissertation Presented in Partial Fulfillment of the Requirement for the Degree Doctor of Philosophy, Arizona State University, Dec. 2019, 119 pages.
Paul, B. et al., "Constant information radar for dynamic shared spectrum access," 2015 49th Asilomar Conference on Signals, Systems and Computers, Nov. 8-11, 2015, Pacific Grove, CA, USA, IEEE, 5 pages.
Paul, B. et al., "Extending joint radar-communications boundsfor fmcw radar with doppler estimation," 2015 IEEE Radar Conference(RadarCon), May 10-15, 2015, Arlington, VA, USA, IEEE, 6 pages.
Paul, B. et al., "Joint communications and radar performance bounds under continuous waveform optimization: The waveform awakens," 2016 IEEE Radar Conference (RadarConf), May 2-6, 2016, Philadelphia, PA, USA, IEEE, 6 pages.
Paul, B. et al., "The Constant Information Radar," Entropy, vol. 18, No. 9, Sep. 2016, MDPI, 23 pages.
Non-Final Office Action for U.S. Appl. No. 16/767,043, mailed Apr. 11, 2022, 23 pages.
Notice of Allowance for U.S. Appl. No. 16/787,300, mailed Sep. 3, 2021, 8 pages.
Herschfelt, A. et al., "Spectrum Management and Advanced Receiver Techniques (SMART): Joint Radar-Communications Network Performance," 2018 IEEE Radar Conference (RadarConf18), Apr. 23-27, 2018, Oklahoma City, OK, USA, IEEE, 6 pages.
Ma, O. et al., "Cooperative Radar and Communications Coexistence Using Reinforcement Learning," 2018 52nd Asilomar Conference on Signals, Systems, and Computers, Oct. 28-31, 2018, IEEE, Pacific Grove, CA, IEEE, 5 pages.
Rong, Y. et al., "MIMO Radar and Communications Spectrum Sharing: A Multiple-Access Perspective," 2018 IEEE 10th Sensor Array and Multichannel Signal Processing Workshop (SAM), Jul. 8-11, 2018, Sheffield, UK, IEEE, 5 pages.
Non-Final Office Action for U.S. Appl. No. 17/521,490, mailed Nov. 10, 2022, 7 pages.
Notice of Allowance for U.S. Appl. No. 17/521,490, mailed Jul. 25, 2023, 11 pages.
Final Office Action for U.S. Appl. No. 17/089,086, mailed Oct. 3, 2023, 23 pages.
Notice of Allowance for U.S. Appl. No. 16/767,043, mailed Mar. 22, 2023, 9 pages.
Final Office Action for U.S. Appl. No. 17/521,490, mailed Mar. 31, 2023, 8 pages.
Non-Final Office Action and Examiner-Initiated Interview Summary for U.S. Appl. No. 17/089,086, mailed Mar. 22, 2023, 20 pages.

* cited by examiner

POSITION INFORMATION ESTIMATION IN A DISTRIBUTED RADIO FREQUENCY (RF) COMMUNICATIONS SYSTEM

RELATED APPLICATIONS

This application claims the benefit of provisional patent application Ser. No. 62/930,232, filed Nov. 4, 2019, the disclosure of which is hereby incorporated herein by reference in its entirety.

The present application is related to U.S. patent application Ser. No. 17/089,086, filed on Nov. 4, 2020, entitled "ESTIMATION AND TRACKING OF POSITION INFORMATION IN A DISTRIBUTED RADIO FREQUENCY (RF) COMMUNICATIONS SYSTEM," which is hereby incorporated herein by reference in its entirety.

FIELD OF THE DISCLOSURE

The present disclosure relates to relative positioning of vehicles based on an exchange of wireless signals.

BACKGROUND

Positioning systems are used to provide information regarding relative positions of objects. For example, vehicle positioning systems use radio frequency (RF) communications to assist operators in travel and operation of air and ground vehicles. For example, aircraft positioning systems assist operators of various aircraft, particularly in critical tasks such as landing. Such positioning systems enable takeoff and landing in low visibility conditions through autonomous systems or presenting pilots with information which enables more accurate manual operation. Aircraft positioning systems are also critical for remote controlled tasks.

Modern vehicle systems, especially unmanned aerial systems (UASs), need to perform more sophisticated tasks in higher density networks than many legacy radio systems can support. This leads to an inflation of RF devices in already congested environments, which consumes limited spectral resources and introduces more interference to existing systems. To support this growing demand for capabilities, performance, and number of users, modern radio systems must use limited spectral access more efficiently and limit interference to nearby systems. Recent results in the field of RF convergence indicate that modern co-design techniques can increase spectral efficiency and limit mutual interference between cooperative systems.

SUMMARY

Position information estimation in a distributed radio frequency (RF) communications system is provided. Embodiments disclosed herein facilitate high-precision estimations of positions, orientations, velocities, and acceleration of network nodes in a distributed RF network (e.g., including base stations and vehicles, such as aircraft or unmanned aerial systems (UASs)). Modern radio systems must adapt to limited spectral access by reducing spectrum demand and increasing operational efficiency. In this regard, an RF system is provided which simultaneously performs positioning and communications tasks. This system specifically addresses the issue of spectral congestion by employing an extremely efficient positioning strategy and using a joint waveform that simultaneously enables both tasks. This efficiency in turn supports more users in a given frequency allocation.

The positioning task is performed using advanced time-of-arrival (ToA) estimation techniques and a synchronization algorithm that measures time-of-flight (ToF) between all pairs of antennas between two nodes. The communications task provides an encrypted data link between RF nodes in the network, which enables phase-accurate timing synchronization and secures the positioning system against cyberattacks such as spoofing. Some examples use multi-antenna RF platforms which additionally enable orientation estimation and multiple-input, multiple output (MIMO) communications.

An exemplary embodiment provides a method for estimating position information in a distributed RF communications system. The method includes receiving a first RF receive signal comprising a first positioning sequence from a first network node. The method further includes estimating a first ToA of the first positioning sequence and estimating relative positional information of the first network node from the estimated first ToA. The method further includes transmitting a first RF transmit signal comprising the estimated first ToA.

Another exemplary embodiment provides an RF device. The RF device includes an RF transceiver and a signal processor coupled to the RF transceiver. The signal processor is configured to receive, from the RF transceiver, a first RF receive signal comprising a first positioning sequence of a first network node, estimate a first ToA of the first positioning sequence, estimate relative positional information of the first network node from the estimated first ToA, and cause the RF transceiver to transmit a first RF transmit signal comprising the estimated first ToA.

Another exemplary embodiment provides a distributed RF communications system. The distributed RF communications system includes a first RF device, which comprises a first RF transceiver a first signal processor coupled to the first RF transceiver. The first signal processor is configured to receive, from the first RF transceiver, a first RF signal of a joint positioning-communications waveform originating from a second RF device, estimate ToA information derived from the first RF signal, estimate relative positional information of the first RF device and the second RF device from the estimated ToA information, and cause the RF transceiver to transmit a second RF signal of the joint positioning-communications waveform, the second RF signal comprising the estimated ToA information and a first positioning sequence of the first RF device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
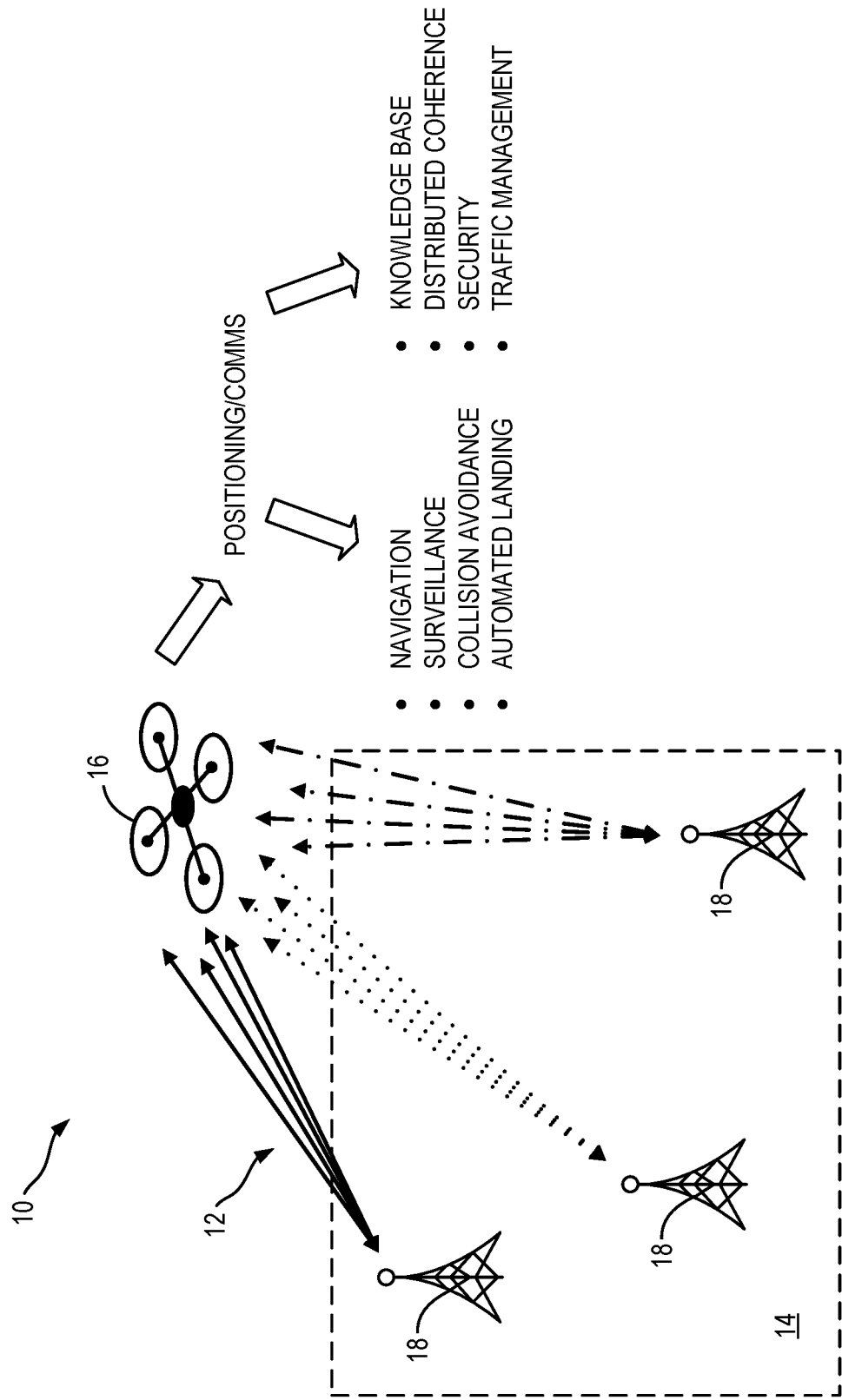
FIG. 1 is a schematic diagram of an exemplary distributed radio frequency (RF) communications system which can estimate position information according to embodiments disclosed herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Position information estimation in a distributed radio frequency (RF) communications system is provided. Embodiments disclosed herein facilitate high-precision estimations of positions, orientations, velocities, and acceleration of network nodes in a distributed RF network (e.g., including base stations and vehicles, such as aircraft or unmanned aerial systems (UASs)). Modern radio systems must adapt to limited spectral access by reducing spectrum demand and increasing operational efficiency. In this regard, an RF system is provided which simultaneously performs positioning and communications tasks. This system specifically addresses the issue of spectral congestion by employing an extremely efficient positioning strategy and using a joint waveform that simultaneously enables both tasks. This efficiency in turn supports more users in a given frequency allocation.

The positioning task is performed using advanced time-of-arrival (ToA) estimation techniques and a synchronization algorithm that measures time-of-flight (ToF) between all pairs of antennas between two nodes. The communications task provides an encrypted data link between RF nodes in the network, which enables phase-accurate timing synchronization and secures the positioning system against cyberattacks such as spoofing. Some examples use multi-antenna RF platforms which additionally enable orientation estimation and multiple-input, multiple output (MIMO) communications.

I. Overview

FIG. 1 is a schematic diagram of an exemplary distributed RF communications system 10 which can estimate position information according to embodiments disclosed herein. In the distributed RF communications system 10, RF signals 12 are exchanged between network nodes in order to facilitate estimation of position information of the network nodes. In the illustrated example, the network nodes include a base station 14 (e.g., a first network node) and an aircraft 16 (e.g., a second network node, such as a UAS). In an exemplary aspect, the aircraft 16 can estimate its position information (e.g., range, position, orientation, and/or acceleration) relative to the base station 14 from the exchanged RF signals 12. In some examples, the base station 14 (and each additional network node in the distributed RF communications system 10) can likewise estimate such position information.

The position information of the aircraft 16 can be used for various tasks, such as formation flying, coordination of safe flight paths, takeoff, landing, and taxiing. In some examples, the RF signals 12 can also carry payload data for communications between the aircraft 16 and the base station 14 or other network nodes in the distributed RF communications system 10. Such payload data may facilitate additional tasks, such as coordination of a formation of aircraft 16.

As illustrated in FIG. 1, the base station 14 can be a distributed base station having multiple antennas 18 to provide more accurate and/or detailed position information (e.g., in addition to range, multiple antennas can provide position and orientation estimation). Similarly, the aircraft 16 can have a multi-antenna RF transceiver. In an illustrative example, the aircraft 16 has a four-antenna transceiver and the base station 14 has three antennas 18, such that twelve RF signals 12 are exchanged between the base station 14 and the aircraft 16 to facilitate improved estimation of position information.

In an exemplary aspect, the distributed RF communications system 10 operates with a 10 megahertz (MHz) bandwidth and maintains a ranging standard deviation below 5 centimeters (cm) for up to 2 kilometers (km) of range. In controlled configurations, this deviation can be driven as low as 1 millimeter (mm). This capability is facilitated by a phase accurate ToA estimation technique and a distributed phase-coherence algorithm, described further below.

It should be understood that while FIG. 1 is described with respect to aircraft 16 in particular, exemplary embodiments may include other types of RF devices, including vehicles. For example, a radio-bearing automobile in the distributed RF communications system 10 may facilitate relevant positioning tasks, such as parking, street navigation, and awareness of other vehicles for passing, accelerating, stopping, and so on. A radio-bearing ship in the distributed RF communications system 10 can facilitate relevant positioning tasks such as navigation, formation travel, collision avoidance, docking, and so on. Embodiments of the present disclosure implemented in such vehicles may be used for assisted operation, remote control, autonomous systems, and so on. In other examples, the network nodes of the distributed RF communications system 10 can include an automobile, ship, train, or other vehicle, or non-vehicular applications where position information is needed or beneficial. In some examples, one or more network nodes in the distributed RF communications system 10 is a satellite.

It should also be understood vehicles, base stations, or other network nodes in embodiments of the present disclosure can include more or fewer antennas than described above. In some embodiments, antennas may be distributed on a network node to optimize operation according to a particular application (e.g., for air-to-ground communication in the example depicted, or for ground-to-ground communication in the example of automobiles). For example, the antennas may be distributed to reduce ground bounce and/or multi-path interference of RF signals transmitted or received by the network node.

Figure 2:
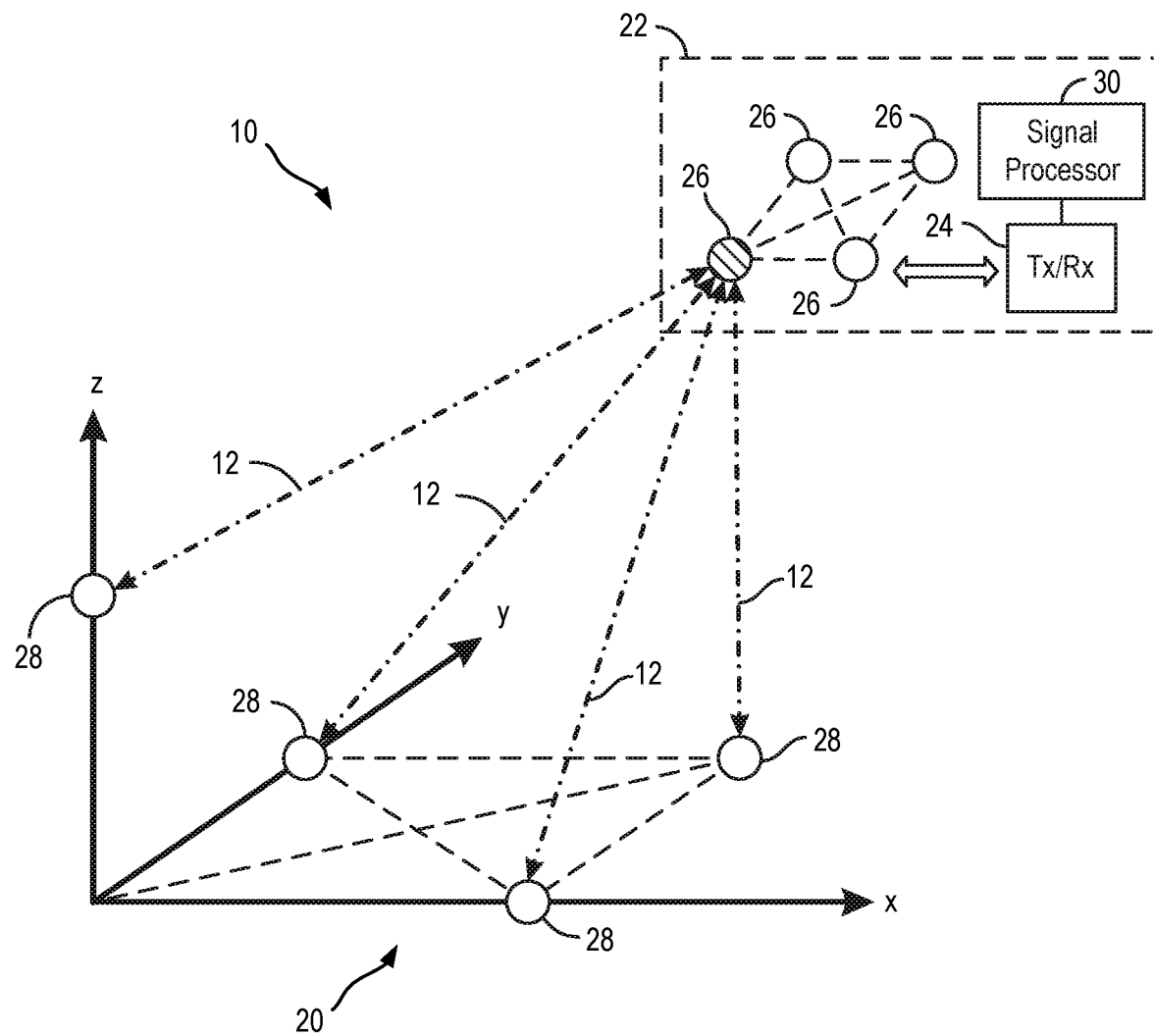
FIG. 2 is a schematic diagram of the distributed RF communications system of FIG. 1, illustrating estimation of position information based on exchanging RF signals between a first network node and a second network node.

FIG. 2 is a schematic diagram of the distributed RF communications system 10 of FIG. 1, illustrating estimation of position information based on exchanging RF signals 12 between a first network node 20 and a second network node 22. Each network node 20, 22 can be a base station (e.g., the first network node can be the base station 14 of FIG. 1) or a vehicle (e.g., the second network node can be the aircraft 16 of FIG. 1). In addition, each network node 20, 22 in the distributed RF communications system 10 can also include or be implemented as an RF device. For example, the second network node 22 includes an RF transceiver 24. The RF transceiver 24 is coupled to one or more antennas 26, through which the RF transceiver 24 can communicate wirelessly with the first network node 20 (e.g., at each of one or more antennas 28).

In an exemplary aspect, the RF transceiver 24 includes an RF receiver and an RF transmitter for communicating wirelessly over RF signals 12. In some examples, the RF transceiver 24 can communicate over cellular or non-cellular RF frequency bands, citizens broadband radio service (CBRS) frequency bands, over microwave frequency bands, over millimeter wave (mmWave) frequency bands, over terahertz frequency bands, over optical frequency bands, and so on. In some examples, the RF transceiver 24 exchanges signals having a narrow bandwidth, such as 10 MHz or less. In some examples, the RF transceiver 24 exchanges signals over a Long-Term Evolution (LTE), Fifth Generation (5G), or other Third Generation Partnership Project (3GPP) cellular communication signal.

As illustrated in FIG. 2, the RF transceiver 24 can couple to an array of antennas 26. Each of the antennas 26 of the second network node 22 may exchange RF signals 12 with each of multiple antennas 28 of the first network node 20 (and additional network nodes in the distributed RF communications system 10). The second network node 22 further includes a signal processor 30 coupled to the RF transceiver 24 to process the RF signals 12 exchanged with the first network node 20. By processing the RF signals 12, the signal processor 30 can estimate position information of the second network node 22 based on relative distances between the antennas 26 of the second network node 22 and each of the antennas 28 of the first network node 20. In addition, a velocity, acceleration, range, bearing, altitude and/or orientation of the second network node 22 can be estimated based on the position information. The position information can be fused with additional information (e.g., additional information received via the distributed RF communications system 10, inertial measurement data, sensor data) to refine the relative and/or absolute position (and/or range, velocity, acceleration, bearing, altitude, and/or orientation) of the second network node 22.

Aspects of the present disclosure describe a distributed RF communications system 10 which estimates the ToA of the RF signals 12 traveling between an antenna 26 of the second network node 22 and each antenna 28 of the first network node 20. A synchronization algorithm (e.g., distributed phase-coherence algorithm) measures time-of-flight (ToF) between all pairs of antennas 26, 28. These estimates are transformed into relative range, position, and/or orientation estimates.

Network nodes 20, 22 within this system 10 simultaneously perform communications and positioning tasks. These tasks are performed by transmitting and receiving a co-use joint positioning-communications waveform that contains both a communications payload and several positioning reference sequences. The positioning sequences are used to estimate the ToA of the received joint positioning-communications waveform. The payload contains timing information that drives a ToF estimation algorithm. By alternating between transmitting and receiving this information, two nodes are able to align their clocks and estimate their relative positions with high precision.

Figure 3A:
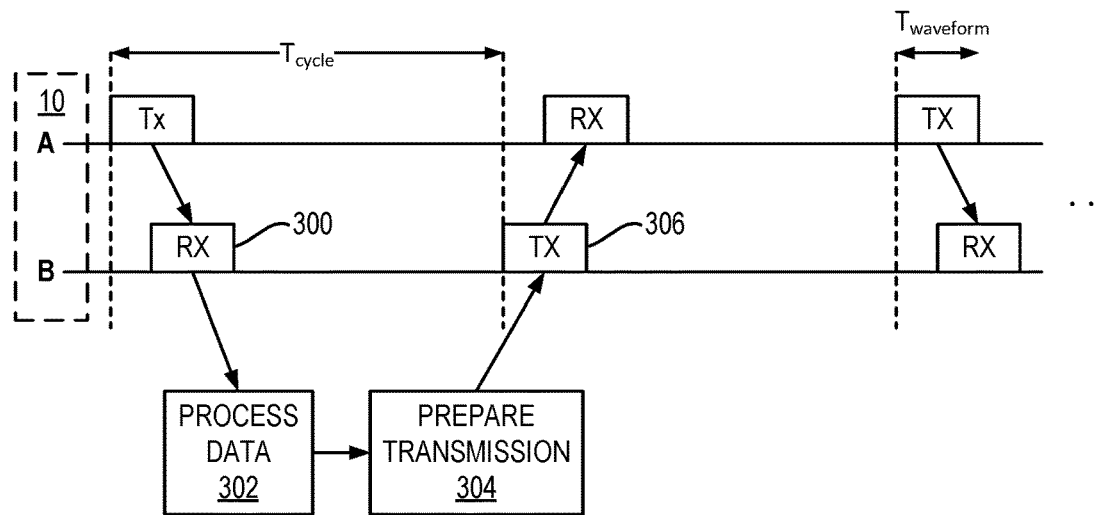
FIG. 3A is a schematic diagram of interactions between the first network node and the second network node of the distributed RF communications system of FIG. 2 over a joint positioning-communications waveform.

FIG. 3A is a schematic diagram of interactions between the first network node 20 and the second network node 22 of the distributed RF communications system 10 of FIG. 2 over a joint positioning-communications waveform. The first network node 20 (node A) and the second network node 22 (node B) alternate between transmitting and receiving periodically over the joint positioning-communications waveform. For example, at operation 300 node B receives a first RF receive signal from node A, which includes the joint positioning-communications waveform. At operation 302, node B processes the received data to produce relative positional information. This can include estimating the ToA of all positioning sequences on all receive channels and extracting timing information from a data payload of the joint positioning-communications waveform.

In some examples, to support additional network nodes in the distributed RF communications system 10 without sacrificing quality of service, spatially adaptive interference mitigation techniques may also be employed at operation 302. The multi-antenna nature of devices in the distributed RF communications system 10 affords spatial diversity that enables a variety of spatial interference mitigation techniques, as well is MIMO communication. Adaptive techniques also allow the system to adapt to network nodes entering and exiting the network, time-varying external interference, changing network environments, and evolving channels. The adaptive techniques may address the following:

1. Internal Interference: Adding network nodes to the distributed RF communications system 10 also increases the number of potential interferers that each must mitigate. Due to the cooperative nature of this system, however, successive interference cancellation (SIC) techniques are a feasible approach to interference mitigation. SIC requires that a receiver reconstructs an estimate of an interfering signal, then subtract it from the signal it originally received. Network nodes within the distributed RF communications system 10 share information about how their waveforms are built, so this reconstruction is tractable. Mutual interference may also be limited by adaptively coordinating power levels across the distributed RF communications system 10 and adaptively scheduling time and frequency slots for different network nodes.

2. External Interference: The distributed RF communications system 10 must also contend with already congested spectral environments, in which it may not have knowledge of the interferers. In this case, the spatial diversity afforded by the multi-antenna platforms may be leveraged to implement spatial beamforming, in which an antenna array is adjusted to maximize incoming energy in the direction of other network nodes and minimizing incoming energy from the interferers. This process must also be adaptive to compensate for interferers that move within the environment.

At operation 304, node B prepares a transmission, which can include assembling the estimated position information (and in some examples, some of the information from the first received signal, such as received ToA or position estimates). At operation 306, node B transmits the joint positioning-communications waveform back to node A using a second signal (e.g., a first transmit signal). In some examples, transmissions are scheduled by a master node (e.g., one of node A or node B, or another node). In some examples, the transmissions occur every 50 milliseconds (ms) (e.g., the cycle duration $T_{cycle}$ is 50 ms). In some examples, the joint positioning-communications waveform has a duration ($T_{waveform}$) of about 1 ms. This transfer of information drives the timing synchronization and ToF estimation algorithm.

Figure 3B:
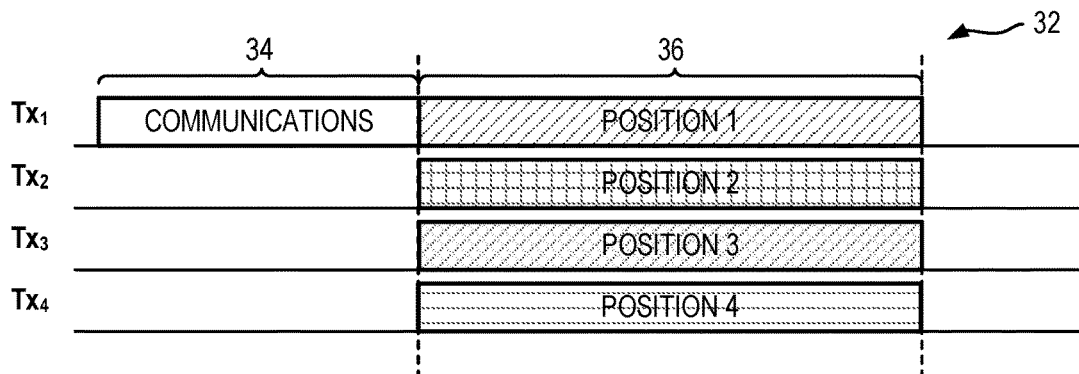
FIG. 3B is a schematic diagram of an exemplary structure of the joint positioning-communications waveform using the protocol of FIG. 3A.

FIG. 3B is a schematic diagram of an exemplary structure of a joint positioning-communications waveform 32 using the protocol of FIG. 3A. A transmission using the joint positioning-communications waveform 32 includes a communications segment 34 and a positioning segment 36. The communications segment 34 contains a data payload and several pilot sequences. In the exemplary joint positioning-communications waveform 32 of FIG. 3B, a code division duplexing (CDD) strategy is used. The CDD strategy consists of placing an orthogonal positioning waveform on each antenna ($Tx_1$, $Tx_2$, $Tx_3$, $Tx_4$) and transmitting them simultaneously.

Figure 3C:
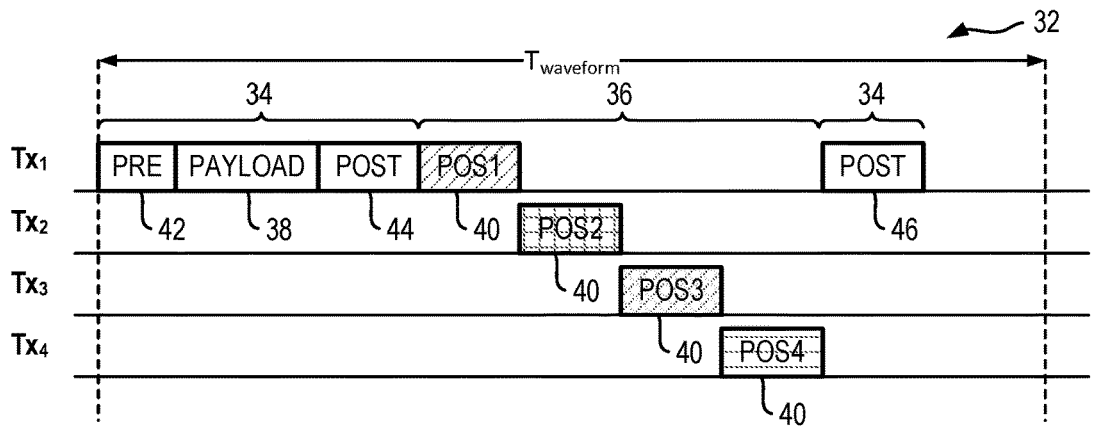
FIG. 3C is a schematic diagram of another exemplary structure of the joint positioning-communications waveform using the protocol of FIG. 3A.

FIG. 3C is a schematic diagram of another exemplary structure of the joint positioning-communications waveform 32 using the protocol of FIG. 3A. In this example, a time division duplexing (TDD) strategy is used. The TDD strategy consists of placing the same waveform on each antenna ($Tx_1$, $Tx_2$, $Tx_3$, $Tx_4$) but transmitting in different time slots. CDD allows a longer waveform which increases signal-to-noise ratio (SNR) relative to TDD, but must account for inter-symbol interference which may limit performance.

In the examples of FIGS. 3B and 3C, the joint positioning-communications waveform 32 contains a data payload 38, several positioning sequences 40 for ToA estimation, a preamble 42, and post-ambles 44, 46 for acquisition and synchronization. The illustrated structure of the joint positioning-communications waveform 32 is for a network node (e.g., the second network node 22 of FIG. 2) with 4 antennas. The first half of the joint positioning-communications waveform 32 contains the data payload 38 and supporting amble sequences 42, 44, 46. The data payload 38 can be placed between a minimum shift keying (MSK) preamble 42 and post-amble 44, which are used by the receiver to acquire and synchronize the received joint positioning-communications waveform 32. The data payload 38 can be modulated using binary phase shift keying (BPSK). A second MSK post-amble 46 can be placed at the end of the joint positioning-communications waveform 32 to enable precise frequency corrections.

The second half of the joint positioning-communications waveform 32 contains the positioning sequences 40. These may be random MSK sequences that have been treated to have low cross correlation properties with each other. One positioning sequence 40 is transmitted from each transmit antenna ($Tx_1$ through $Tx_4$), following the CDD or TDD scheme. The TDD strategy can mitigate inter-symbol interference (ISI) at the receiver, which estimates the ToA of each sequence at each receive antenna. This further allows the receiver to unambiguously estimate the path length to each transmit antenna. For two 4-antenna network nodes, there are 16 transmit-receive links that can be estimated.

In an exemplary aspect, the data payload 38 includes a positional information estimate from the transmitting network node, which can include delay, offset, radial acceleration, and/or clock frequency drift estimates, as well as relative range, position, velocity, acceleration, bearing, altitude, and/or orientation estimates. In some examples, the data payload 38 includes inertial information from an inertial navigation unit (which can include fused data from an accelerometer, gyroscope, global positioning system (GPS) device, optical data from a camera, etc.). In other examples, the data payload 38 can include distributed coherence information or beamforming information, which can be used to select antennas (e.g., where more than four antennas are available) and/or communication protocols which are best for communication and/or position estimation.

FIGS. 3B and 3C are illustrated with the communications segment 34 (including the data payload 38) transmitted from a first transmit antenna ($Tx_1$). It should be understood that embodiments of the joint positioning-communications waveform 32 can transmit portions of the communications segment 34 (e.g., portions or all of the data payload 38) from any of the transmit antennas ($Tx_1$, $Tx_2$, $Tx_1$, $Tx_4$), or combinations of the transmit antennas (including all of the transmit antennas), such as using a MIMO communication scheme.

Figure 4:
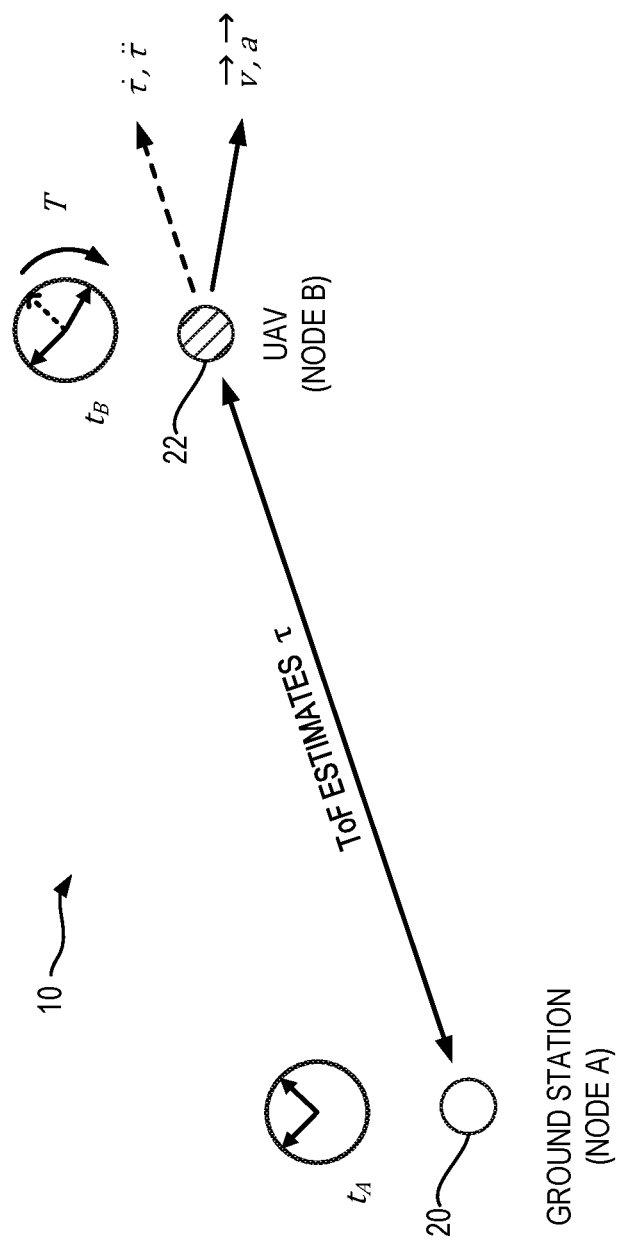
FIG. 4 is a schematic diagram of the exemplary distributed RF communications system, illustrating a clock offset between the first network node and the second network node of FIG. 2.

FIG. 4 is a schematic diagram of the exemplary distributed RF communications system 10, illustrating a clock offset between the first network node 20 (e.g., node A) and the second network node 22 (e.g., node B) of FIG. 2. For illustrative purposes, the first network node 20 (illustrated as node A) can be assumed to be stationary and tethered to the ground while the second network node 22 (illustrated as node B) is airborne, moving with a velocity $\vec{v}$ and acceleration $\vec{a}$ in a three-dimensional Cartesian space.

Nodes A and B are driven by independent clocks and they communicate over a single-input-single-output (SISO) line-of-sight environment. The two nodes sequentially exchange communications waveforms that include transmit $t_{(\cdot),Tx}$ and receive $t_{(\cdot),Rx}$ timestamps. These timestamps are leveraged to estimate the stochastic processes, relative clock offsets (T) and propagation time (e.g., ToF (τ)) between the two network nodes 20, 22. Radial velocity $\dot{\tau}$ and acceleration $\ddot{\tau}$ act along the dashed line. Proposed methods readily generalize to multiple node networks operating on multi-antenna platforms.

II. Timing Exchange Protocol

This section describes a timing exchange protocol used by embodiments of the present disclosure and corroborate its workings for the scenario depicted in FIG. 4.

A. Notation

Figure 5:
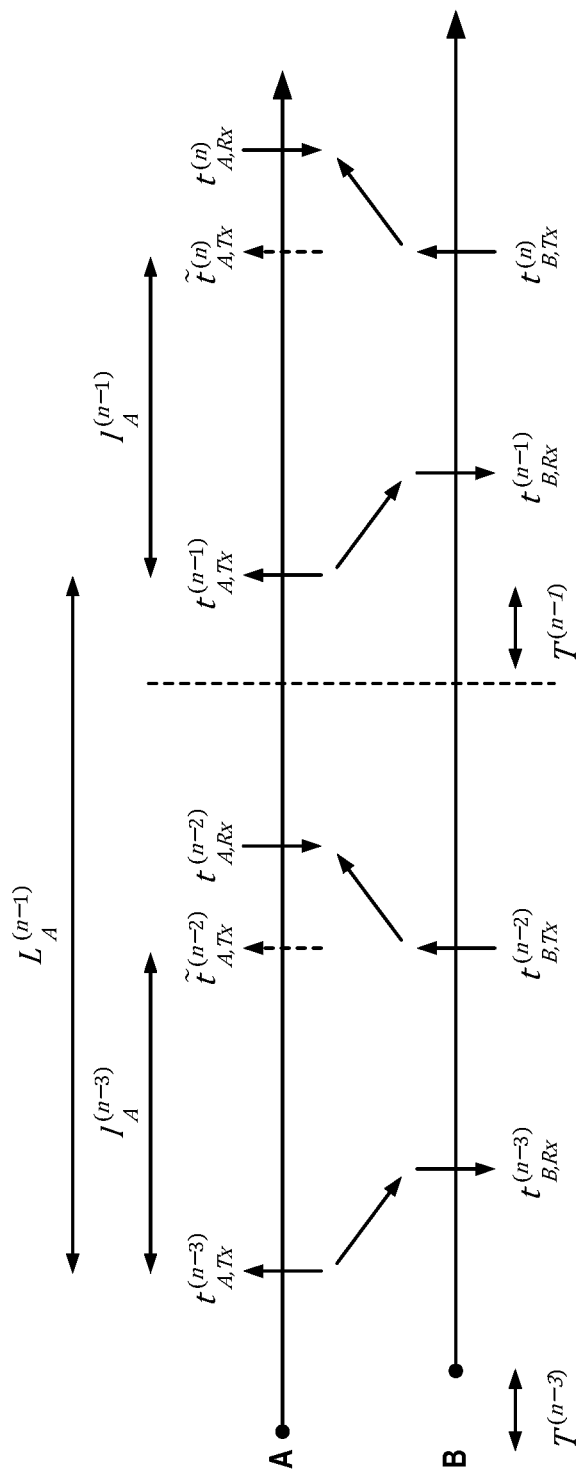
FIG. 5 is a flow diagram illustrating an exemplary timing exchange model at node A of FIG. 4 for two cycles using the joint positioning-communications waveform of FIGS. 3A-3C.

FIG. 5 is a flow diagram illustrating an exemplary timing exchange model at node A of FIG. 4 for two cycles using the joint positioning-communications waveform 32 of FIGS. 3A-3C. Each cycle can span two frames, and the cycles are separated by time $L_A$, indicated by a dashed line. Designated master node A transmits the joint positioning-communications waveform 32 to node B in the first frame, node B waits for an agreed frame separation l and transmits it back to node A during the second frame. The transmit timestamp $t_{B,Tx}^{(n)}$ is perceived by node A as $\tilde{t}_{A,Tx}^{(n)}$ (shown in dashed line) and frame length l as $l_A$ due to clock offset T.

In the timing exchange model, the timestamps are denoted by $t_{(\cdot),(\cdot)}^{(\cdot)}$; the first subscript indicates at which node the event occurs and the second subscript indicates if it was a transmit or receive event. The superscript is an indication of the frame during which the event occurs. Nodes A and B are driven by independent clocks, which at any given time read $t_A$ and $t_B$. The relative time offset (T) is the time difference between the two clocks, $T=t_A - t_B$. By convention, a positive T denotes that clock B displays an earlier time than clock A. Relative frequency offset and drift between the two clocks are represented by $\dot{T}$ and $\ddot{T}$, respectively. The propagation delay (τ) is the time taken for a joint positioning-communications waveform to traverse the distance between the two nodes.

Relative velocity and acceleration of node B with respect to node A in the direction of the line joining them is termed radial velocity ($\dot{\tau}$) and acceleration ($\ddot{\tau}$). These parameters during a given frame are associated with the timestamps of transmit events. Nodes A and B take turns to exchange timing information in successive frames separated by $l_{(\cdot)}$. They, however, have sufficient information to synchronize clocks only every couple of frames, called a cycle. Two successive cycles are $L_{(\cdot)}$ apart. The subscripts for both frame length $l_{(\cdot)}$ and cycle separation $L_{(\cdot)}$ correspond to the evaluating node. All essential notations are delineated in the Table I below.

TABLE I

Terminology pertaining to timing exchange protocol at a given instance of time indicated by the superscript.
Timing Model Notation

| | |
|---|---|
| $t_{A,Tx}^{(\cdot)}$ | Transmit event timestamp at node A |
| $t_{A,Rx}^{(\cdot)}$ | Receive event timestamp at node A |
| $t_{B,Tx}^{(\cdot)}$ | Transmit event timestamp at node B |
| $t_{B,Rx}^{(\cdot)}$ | Receive event timestamp at node B |
| $\tilde{t}_{A,Tx}^{(\cdot)}$ | Perceived event timestamp at node B by A |
| $l_{(\cdot)}$ | Perceived frame length l by node A |
| $L_{(\cdot)}$ | Perceived cycle length L by node A |
| $\tau^{(\cdot)}$ | Relative ToF between nodes A and B |
| $\dot{\tau}^{(\cdot)}$ | Relative radial velocity between nodes A and B |
| $\ddot{\tau}^{(\cdot)}$ | Relative radial acceleration between nodes A and B |
| $T^{(\cdot)}$ | Relative time offset between clocks A and B |
| $\dot{T}^{(\cdot)}$ | Relative frequency offset between clocks A and B |
| $\ddot{T}^{(\cdot)}$ | Relative frequency drift between clocks A and B |

B. Formulation

As suggested earlier, every cycle consists of two frames. Designated master node A transmits a communication packet to node B in the first frame, node B waits for an agreed frame separation l and transmits a packet to node A during the second frame as depicted in FIG. 5. Each packet comprises a transmit timestamp $t_{(\cdot),Tx}$ of the transmitting node along with communication payload. Exemplary embodiments are concerned with estimating clock offset (T) and relative ToF (τ) between the two nodes for the cycle containing $(n-1)^{th}$ and $(n)^{th}$ frames while making an assumption that estimates of these parameters for previous cycles are available.

For a transmission from node A to node B, during frame (n−1), node B will receive the signal at time:

$$t_{B,Rx}^{(n-1)} = t_{A,Tx}^{(n-1)} + \tau^{(n-1)} - T^{(n-1)} \qquad \text{Equation 1}$$

whereas a transmission from B to A, during frame (n), node A will receive the signal at time:

$$t_{A,Rx}^{(n)} = t_{B,Tx}^{(n)} + \tau^{(n)} - T^{(n)} \qquad \text{Equation 2}$$

The two radios nodes A and B are required to transmit every frame separated by l. However, oscillator offset and drifts within the radios force the frame length l to be time dependent and different for each node. Therefore, the transmit timestamp $t_{B,Tx}^{(n)}$ is perceived by node A as $\tilde{t}_{A,Tx}^{(n)}$ due to clock discrepancies:

$$\tilde{t}_{A,Tx}^{(n)} = t_{B,Tx}^{(n)} + T^{(n)} \qquad \text{Equation 3}$$

Also, frame length l measures to $l_A$ and cycle separation L to $L_A$ respectively on clock driving node A, which for the current cycle of interest become:

$$l_A^{(n-1)} = \tilde{t}_{A,Tx}^{(n)} - t_{A,Tx}^{(n-1)} \qquad \text{Equation 4}$$

$$L_A^{(n-1)} = t_{A,Tx}^{(n-1)} - t_{A,Tx}^{(n-3)} \qquad \text{Equation 5}$$

These formulations are used herein to aid delay and offset estimation.

III. Joint Delay-Offset Estimator—First Order

In this section, a novel two-way ranging estimator is proposed that not only synchronizes clocks on the two network nodes A and B but also estimates ToF between them. A first-order Markov model is defined using propagation delay τ and clock time offset T, as suggested in Equations 6 and 7 below, providing an optimal and time efficient estimation method. Interestingly, this joint estimation process reduces to solving a system of linear equations and the estimates take on very simple form.

It is assumed that the propagation delay and time offset between the nodes A and B follow a linear model:

$$\tau^{(n)} = \tau^{(n-1)} + \dot{\tau}^{(n-1)} l_A^{(n-1)} \qquad \text{Equation 6}$$

$$T^{(n)} = T^{(n-1)} + \dot{T}^{(n-1)} l_A^{(n-1)} \qquad \text{Equation 7}$$

Equations 1 and 2 are extended to realize them with a common basis, e.g., reduce equations corresponding to frame (n) to derivatives of frame (n-1). Therefore:

$$t_{B,Rx}^{(n-1)} = t_{A,Tx}^{(n-1)} + \tau^{(n-1)} - T^{(n-1)} \qquad \text{Equation 8}$$

$$t_{A,Rx}^{(n)} = t_{B,Tx}^{(n)} + \tau^{(n)} + T^{(n)} \qquad \text{Equation 9}$$
$$= t_{B,Tx}^{(n)} + \tau^{(n-1)} + \dot{\tau}^{(n-1)} l_A^{(n-1)} +$$
$$T^{(n-1)} + \dot{T}^{(n-1)} l_A^{(n-1)}$$

As evident in FIG. 5, node A perceives frame length between the frames (n-1) and (n) as $l_A^{(n-1)}$, which is computed in two steps. First, $t_{A,Tx}^{(n)}$ is estimated by solving for Equation 3 using Equations 7 and 4 as:

$$\tilde{t}_{A,Tx}^{(n)} = \frac{t_{B,Rx}^{(n-1)} + \tau^{(n-1)} - \dot{T}^{(n-1)} t_{A,Tx}^{(n-1)}}{1 - \dot{T}^{(n-1)}} \qquad \text{Equation 10}$$

which is then substituted in Equation 4 to obtain $l_A^{(n-1)}$:

$$l_A^{(n-1)} = \frac{t_{B,Tx}^{(n)} - t_{A,Tx}^{(n-1)} + T^{(n-1)}}{1 - \dot{T}^{(n-1)}} \qquad \text{Equation 11}$$

As a result, Equation 9 is simplified as follows by replacing $l_A^{(n-1)}$ with the quantity in Equation 11:

$$t_{A,Rx}^{(n)} - t_{B,Tx}^{(n)} = \tau^{(n-1)} + T^{(n-1)} + \dot{\tau}^{(n-1)} \left\{ \frac{t_{B,Tx}^{(n)} - t_{A,Tx}^{(n-1)} + T^{(n-1)}}{1 - \dot{T}^{(n-1)}} \right\} + \dot{T}^{(n-1)} \left\{ \frac{t_{A,Rx}^{(n)} - t_{A,Tx}^{(n-1)} + T^{(n-1)}}{1 - \dot{T}^{(n-1)}} \right\} \qquad \text{Equation 12}$$

One should note that Equation 12 is now independent of factors other than ToA timestamps, clock time and frequency offset, T and $\dot{T}$, ToF and radial velocity, τ and $\dot{\tau}$ respectively for $(n-1)^{th}$ frame. $\dot{\tau}$ and $\dot{T}$ are further reduced to rely on estimates of previous transmission frame (n-3) using the following assumptions:

$$\dot{\tau}^{(n-1)} = \frac{\tau^{(n-1)} - \hat{\tau}^{(n-3)}}{L_A^{(n-1)}} \qquad \text{Equation 13}$$

$$\dot{T}^{(n-1)} = \frac{T^{(n-1)} - \hat{T}^{(n-3)}}{L_A^{(n-1)}} \qquad \text{Equation 14}$$

where $L_A^{(\cdot)} = t_{A,Tx}^{(n-1)} - t_{A,Tx}^{(n-3)}$ is time elapsed between two successive transmissions at node A. Unfolding Equation 12 by replacing for the clock frequency offset $\dot{T}^{(n-1)}$ and radial velocity $\dot{\tau}^{(n-1)}$ with Equations 13 and 14, reduces relationship between delay $\tau^{(n-1)}$ and time offset $T^{(n-1)}$ to a linear form. This implies that Equations 1 and 2 can be reduced to a system of linear equations in $\tau^{(n-1)}$ and $T^{(n-1)}$ as depicted here:

$$\tau^{(n-1)} - T^{(n-1)} = \delta_A^{(n-1)} \qquad \text{Equation 15}$$

$$\varepsilon_A^{(n-1)} \tau^{(n-1)} + \zeta_A^{(n-1)} T^{(n-1)} = \eta_A^{(n-1)} \qquad \text{Equation 16}$$

where $$\delta_A^{(n-1)} = t_{B,Tx}^{(n-1)} - t_{A,Tx}^{(n-1)}$$

$$\varepsilon_A^{(n-1)} = L_A^{(n-1)} + t_{B,Tx}^{(n)} - t_{A,Tx}^{(n-1)} + T^{(n-3)}$$

$$\zeta_A^{(n-1)} = L_A^{(n-1)} + t_{A,Rx}^{(n)} - t_{A,Tx}^{(n-1)} - \tau^{(n-3)}$$

$$\eta_A^{(n-1)} = t_{A,Rx}^{(n)}(T^{(n-3)} + L_A^{(n-1)}) + t_{B,Tx}^{(n)}(\tau^{(n-3)} - L_A^{(n-1)}) - t_{A,Tx}^{(n-1)}(\tau^{(n-3)} + T^{(n-3)}) \qquad \text{Equation 17}$$

Therefore the estimates of ToF and clock offset, $\hat{\tau}^{(n-1)}$ and $\hat{T}^{(n-1)}$ at node A are obtained by solving Equations 15 and 16:

$$\hat{\tau}^{(n-1)} = \frac{\eta_A^{(n-1)} + \zeta_A^{(n-1)} \delta_A^{(n-1)}}{\varepsilon_A^{(n-1)} + \zeta_A^{(n-1)}} \qquad \text{Equation 18}$$

$$\hat{T}^{(n-1)} = \frac{\eta_A^{(n-1)} - \varepsilon_A^{(n-1)} \delta_A^{(n-1)}}{\varepsilon_A^{(n-1)} + \zeta_A^{(n-1)}}$$

These results are extended to estimate clock frequency offset ($\dot{T}$) and radial velocity ($\dot{\tau}$) using Equations 13 and 14. Also, delay and time offset estimates for $(n)^{th}$ frame, $\tau^{(n)}$ and $T^{(n)}$ respectively, are computed using Equations 6 and 7.

IV. Joint Delay-Offset Estimator—Second Order

In the previous section, the models on delay and offset do not acknowledge the frequency drift of clock oscillators on network nodes A and B. Also, it was assumed that the flight path node B traverses does not induce any varying radial acceleration between the two radio platforms. These assumptions manifest as limitation on the estimator's performance for scenarios which defy them. Here, the models are extended to loosen these assumptions and include radial acceleration (f) and clock frequency drift (p). Estimators are then built for this renewed premise.

$$\tau^{(n)} = \tau^{(n-1)} + \dot{\tau}^{(n-1)} l_A^{(n-1)} + \tfrac{1}{2}\ddot{\tau}^{(n-1)} l_A^{(n-1)^2}$$

Equation 19

$$T^{(n)} = T^{(n-1)} + \dot{T}^{(n-1)} l_A^{(n-1)} + \tfrac{1}{2}\ddot{T}^{(n-1)} l_A^{(n-1)^2}$$

Equation 20 where the radial velocity ($\dot{\tau}$) and time offset ($\dot{T}$) are defined in Equations 13 and 14 respectively and the radial acceleration ($\ddot{\tau}$) and clock frequency drift ($\ddot{T}$) are defined as follows:

$$\ddot{\tau}^{(n-1)} = \frac{\dot{\tau}^{(n-1)} - \dot{\tau}^{(n-3)}}{L_A^{(n-1)}}$$

Equation 21

$$\ddot{T}^{(n-1)} = \frac{\dot{T}^{(n-1)} - \dot{T}^{(n-3)}}{L_A^{(n-1)}}$$

Equation 22 where the cycle separation is $L_A^{(n-1)} = t_{A,Tx}^{(n-1)} - t_{A,Tx}^{(n-3)}$ and frame length $l_A^{(n-1)} = t_{A,Tx}^{(n)} - t_{A,Tx}^{(n-1)}$. The time at which node B transmits during frame (n) is perceived by node A as $\tilde{t}_{A,Tx}^{(n)}$ as shown in FIG. 2, which is based on assumptions made in Equation 20 and following Equation 3, becomes:

$$\tilde{t}_{A,Tx}^{(n)} = t_{B,Tx}^{(n)} + T^{(n-1)} + \dot{T}^{(n-1)} l_A^{(n-1)} + \tfrac{1}{2}\ddot{T}^{(n-1)} l_A^{(n-1)^2}$$

Equation 23

The frame length $l_A^{(n-1)}$ is now evaluated by solving the quadratic function:

$$\tfrac{1}{2}\alpha_A^{(n-1)} l_A^{(n-1)^2} - \beta_A^{(n-1)} l_A^{(n-1)} + \gamma_A^{(n-1)} = 0$$

Equation 24 where $$\alpha_A^{(n-1)} = \ddot{T}^{(n-1)};\, \beta_A^{(n-1)} = 1 - \dot{T}^{(n-1)};\, \gamma_A^{(n-1)} = T^{(n-1)} + t_{B,Tx}^{(n)} - t_{A,Tx}^{(n-1)}$$

Equation 25

If $\ddot{T}^{(n-1)} = 0$, $l_A^{(n-1)}$ reduces to Equation 11. Otherwise, a feasible solution to frame length, which exists if and only if $\beta_A^{(n-1)^2} - 2\alpha_A^{(n-1)}\gamma_A^{(n-1)} \geq 0$, is:

$$l_A^{(n-1)} = \frac{\beta_A^{(n-1)} - \sqrt{\beta_A^{(n-1)^2} - 2\alpha_A^{(n-1)}\gamma_A^{(n-1)}}}{\alpha_A^{(n-1)}}$$

Equation 26

Therefore, solving the following system of equations, while replacing $l_A^{(n-1)}$ with Equation 26, considering assumptions delineated in Equations 13, 14, 21, and 22 ensues estimates for delay and offset:

$$\tau^{(n-1)} - T^{(n-1)} = \delta_A^{(n-1)}$$

Equation 27

$$\left\{\begin{array}{l} \tau^{(n-1)} + \dot{\tau}^{(n-1)} l_A^{(n-1)} + \dfrac{1}{2}\ddot{\tau}^{(n-1)} l_A^{(n-1)^2} + \\ T^{(n-1)} + \dot{T}^{(n-1)} l_A^{(n-1)} + \dfrac{1}{2}\ddot{T}^{(n-1)} l_A^{(n-1)^2} \end{array}\right\} = \lambda_A^{(n-1)}$$

Equation 28 where $$\delta_A^{(n-1)} = t_{B,Rx}^{(n-1)} - t_{A,Tx}^{(n-1)}$$

Equation 29

$$\lambda_A^{(n-1)} = t_{A,Rx}^{(n)} - t_{B,Tx}^{(n)}$$

It is important to identify that, though these equations look highly non-linear, the nature of $l_A^{(n-1)}$ forces them to a set of linear equations. It is, however, neither convenient nor intuitive to write it out explicitly. These estimates are also extended to estimate clock frequency offset ($\dot{T}$) and radial velocity ($\dot{\tau}$) using Equations 13 and 14. Also, delay and time offset estimates for (n)$^{th}$ frame, $\tau^{(n)}$ and $T^{(n)}$ respectively, are computed using Equations 6 and 7.

V. Comparative Analysis

Figure 6:
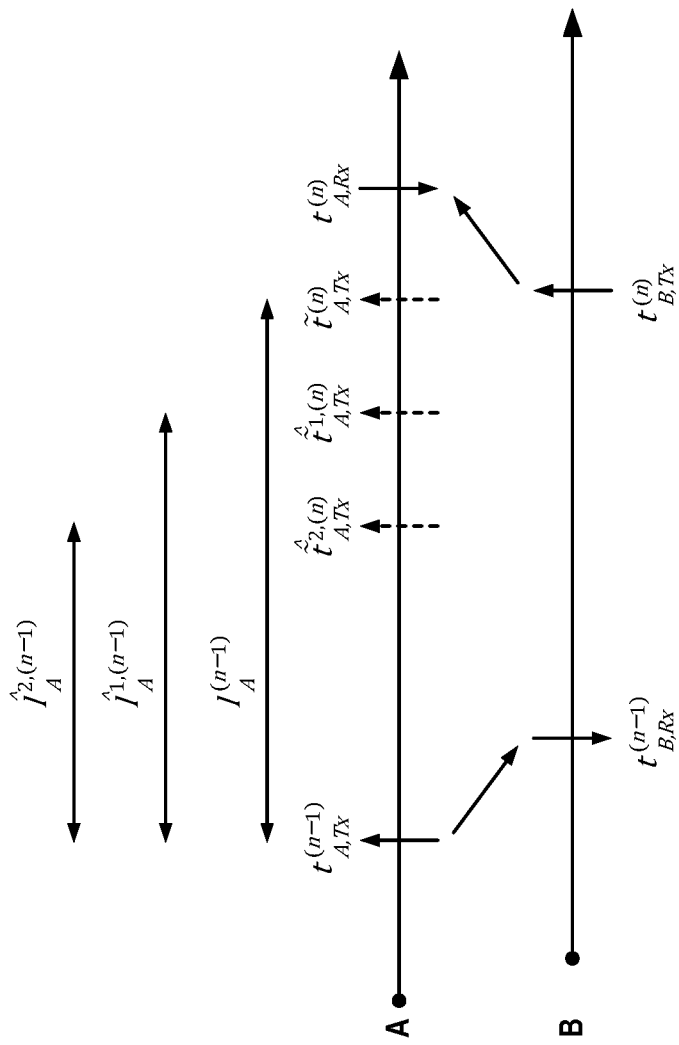
FIG. 6 is a flow diagram illustrating the timing exchange model of FIG. 5 at node A of FIG. 4 for two frames, as analyzed for simulations illustrated in FIGS. 7 and 8.
Figure 7:
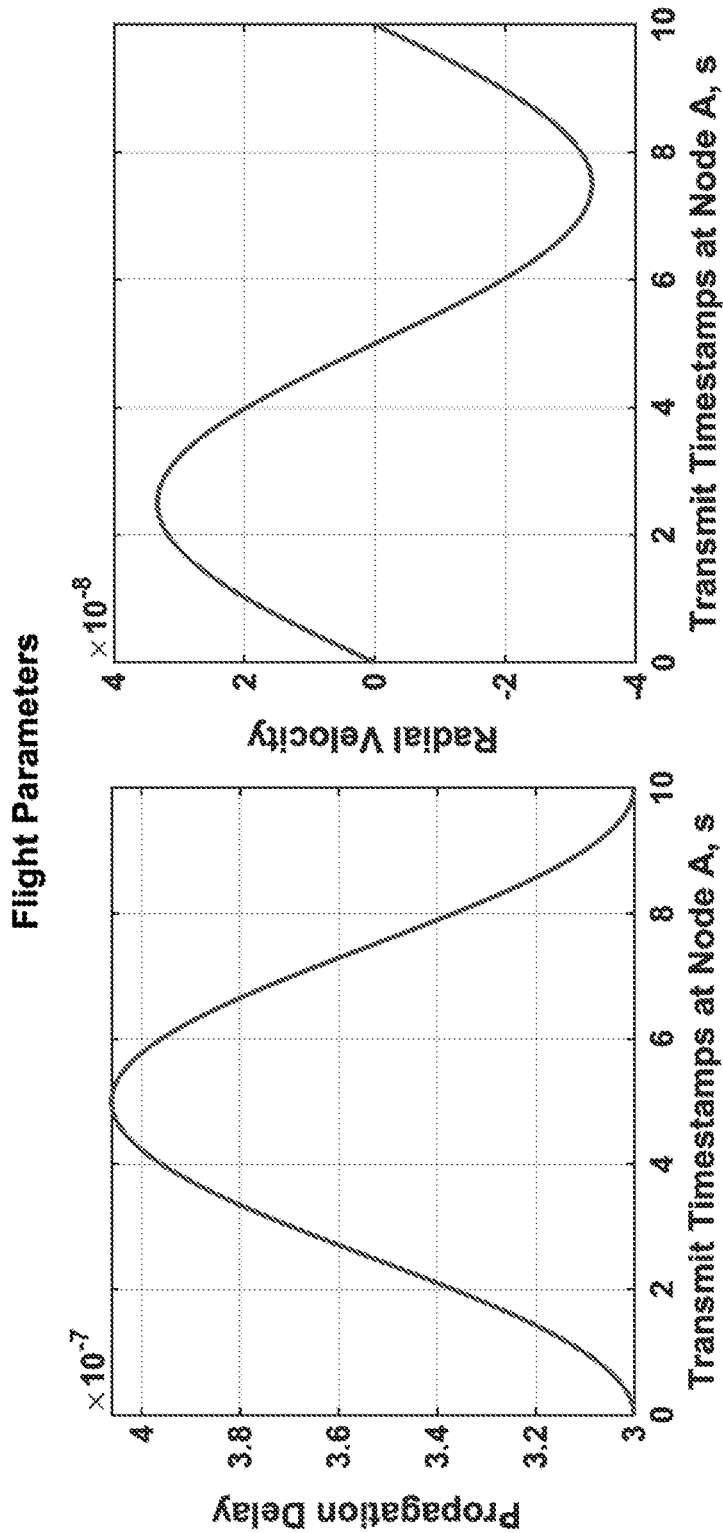
FIG. 7 is a graphical representation of simulated flight parameters propagation delay r and radial velocity t.
Figure 8:
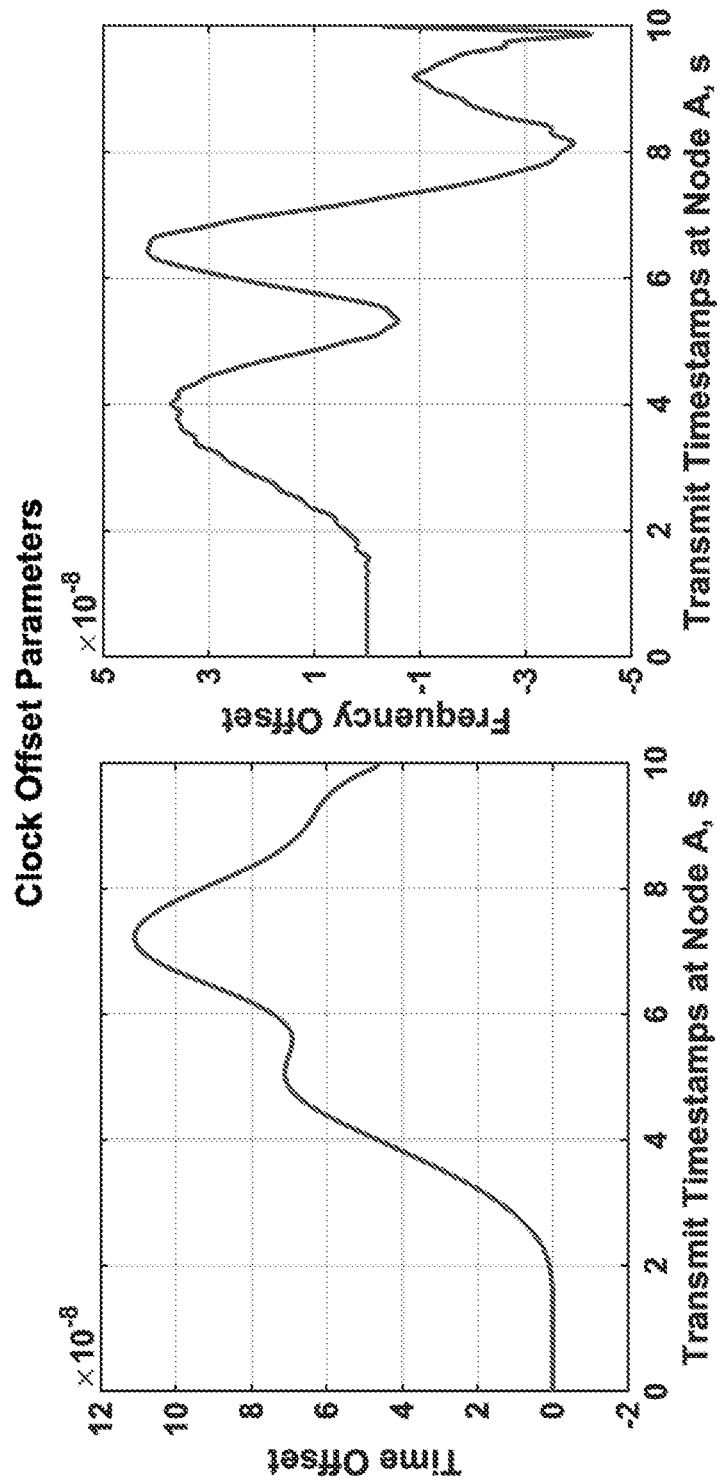
FIG. 8 is a graphical representation of simulated clock offset parameters time offset T and frequency offset P.

FIG. 6 is a flow diagram illustrating the timing exchange model of FIG. 5 at node A of FIG. 4 for two frames, as analyzed for simulations illustrated in FIGS. 7 and 8. The transmit timestamp $t_{B,Tx}^{(n)}$ is perceived by node A as $\tilde{t}_{A,Tx}^{(n)}$ and frame length 1 as $l_A^{(n-1)}$ due to clock offset T. The proposed methods estimate these parameters as $\hat{t}_{B,Tx}^{i,(n)}$ and $\hat{l}_A^{i,(n-1)}$ where i indicates the different methods whose estimates are shown in FIG. 6.

Using the illustrated timing exchange model, performance of the two delay-offset estimation methods is analyzed and their regions of applicability are defined. With continuing reference to FIGS. 4 and 6, two nodes A and B are simulated, where node A is a stationary ground node and node B is an unmanned aerial vehicle moving in a three-dimensional space. Node A is designated as the master node and is estimating the relative delay ($\tau$) to node B while also measuring relative clock offset (T) between the two clocks. Node A initiates the two-way ranging algorithm; the two nodes A and B exchange information every l=10 ms to produce transmit and receive timestamps.

FIG. 7 is a graphical representation of simulated flight parameters propagation delay $\tau$ and radial velocity $\dot{\tau}$. To portray the performance of the methods, node B's flight path is simulated for 10 seconds duration with varying acceleration. The relative propagation delay r and radial velocity t between the two nodes A and B during the duration of the flight are illustrated.

FIG. 8 is a graphical representation of simulated clock offset parameters time offset T and frequency offset $\dot{T}$. The clocks driving the two nodes A and B are not synchronized, and their relative clock offset T and frequency offset $\dot{T}$ are illustrated. One should note that both the frequency drift D and radial acceleration Y are varying and non-zero. The transmit timestamps ($t_{A,Tx}$) at node A are assumed to be known with absolute certainty. Node A estimates perceived transmit timestamps at node B as $\hat{t}_{A,Tx}$ and frame length as $\hat{l}_A$, as illustrated in FIG. 6. The receive timestamps ($t_{(\cdot),Rx}$) (e.g., ToA estimates) are estimated within a standard deviation of $10^{-9}$ seconds.

For the depicted scenario, performance of the estimators is summarized in the Table II below. Since all the estimators are unbiased, their root mean squared error RMSE= $\sqrt{\Sigma_N(\theta-\hat{\theta})^2}$ performance for different metrics are compared, where N indicates number of frames. Mean computational time $t_{comp}$ of the two methods when implemented on MATLAB© platform is also included where the second order estimator utilizes numerical solver vpasolve( ) to solve for the system of equations. The delay and offset parameters estimated by the proposed algorithms are associated with transmit instances $t_{A,Tx}^{(\cdot)}$ for odd frames and $\hat{t}_{A,Tx}$ for even ones. Since the three methods estimate frame length, they fundamentally disagree on the time lattice on which these estimates lie as evident in FIG. 3. This was taken into consideration while assessing performance of the estimators.

TABLE II

Summary of estimator performance depicted using standard deviation of propagation delay τ (seconds), relative radial velocity τ̇, clock time offset T (seconds), frequency offset Ṫ, frame length $l_A$ (seconds) and corresponding computation time $t_{comp}$ (ms).
Comparison of Estimator Performance

|  | First Order | Second Order |
| --- | --- | --- |
| $\sigma_\tau$, s | $8.78e^{-10}$ | $9.02e^{-10}$ |
| $\sigma_T$, s | $8.18e^{-10}$ | $8.45e^{-10}$ |
| $\sigma_{l_A}$, s | $9.54e^{-10}$ | $9.98e^{-10}$ |
| $\sigma_{\dot\tau}$, s | $4.31e^{-8}$ | $4.25e^{-8}$ |
| $\sigma_{\dot T}$, s | $4.27e^{-8}$ | $4.23e^{-8}$ |
| $t_{comp}$, ms | 0.01 | 30 |

From Table II it is important to note that:

The RMSE performance difference between the two estimators is indistinguishable whereas the first order estimator is far superior in computational efficiency.

The first order method ignores constant frequency drift whereas the second order technique provides decent estimates of Y and D.

The effect of changing signal-to-noise ratio (SNR) on performance of these estimators was also studied. To do so, for the same flight path the transmit power in the joint positioning-communications system was changed and the performance of different estimators was assessed.

VI. Method for Estimating Position Information

Figure 9:
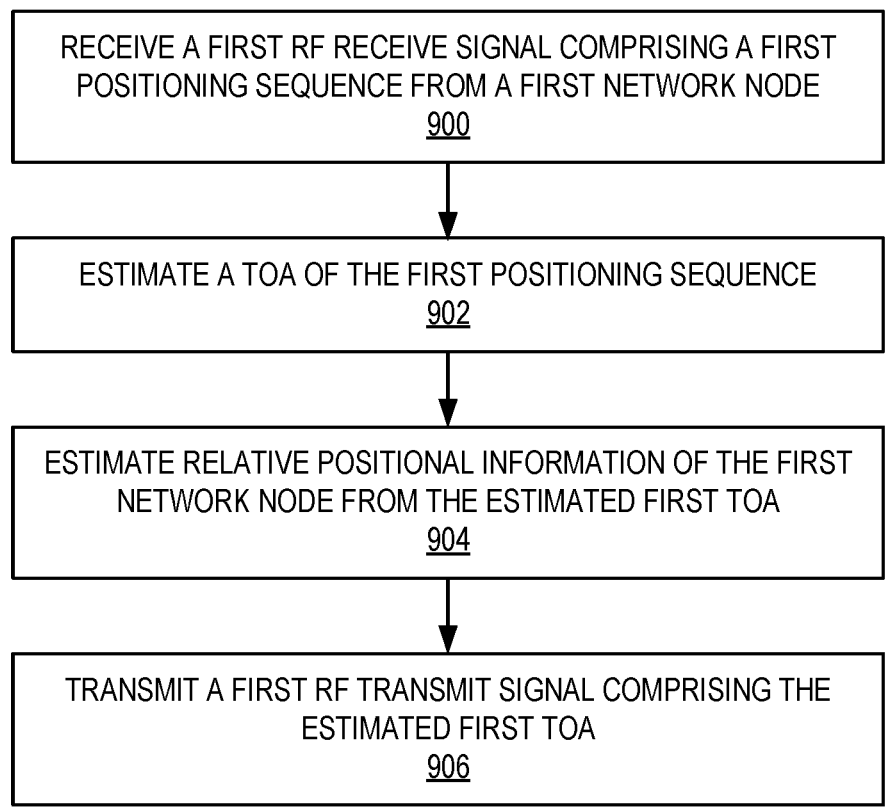
FIG. 9 is a flow diagram illustrating a process for estimating position information in a distributed RF communications system.

FIG. 9 is a flow diagram illustrating a process for estimating position information in a distributed RF communications system. The process begins at operation 900, with receiving a first RF receive signal comprising a first positioning sequence from a first network node. The process continues at operation 902, with estimating a first ToA of the first positioning sequence. The process continues at operation 904, with estimating relative positional information of the first network node from the estimated first ToA. The process continues at operation 906, with transmitting a first RF transmit signal comprising the estimated first ToA.

Although the operations of FIG. 9 are illustrated in a series, this is for illustrative purposes and the operations are not necessarily order dependent. Some operations may be performed in a different order than that presented. Further, processes within the scope of this disclosure may include fewer or more steps than those illustrated in FIG. 9.

VII. Computer System

Figure 10:
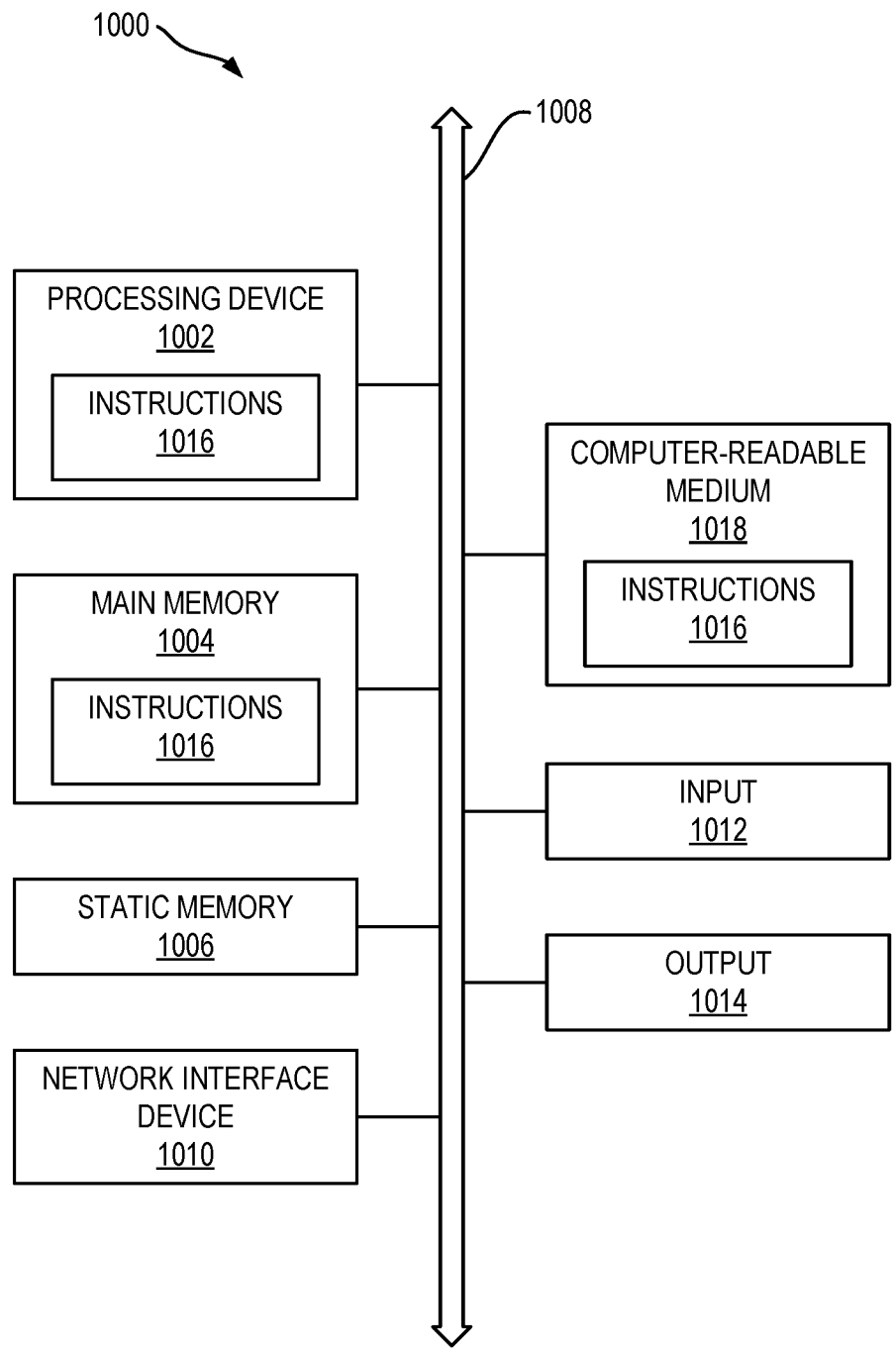
FIG. 10 is a schematic diagram of a generalized representation of an exemplary computer system that could be used to perform any of the methods or functions described above, such as estimating position information in a distributed RF communications system.

FIG. 10 is a schematic diagram of a generalized representation of an exemplary computer system 1000 that could be used to perform any of the methods or functions described above, such as estimating position information in a distributed RF communications system. In some examples, one or more of the network nodes 20, 22 of FIG. 2 are implemented as the computer system 1000. In this regard, the computer system 1000 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1000 in this embodiment includes a processing device 1002 or processor (e.g., the signal processor 30 of FIG. 2), a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processing device 1002 may be connected to the main memory 1004 and/or static memory 1006 directly or via some other connectivity means. In an exemplary aspect, the processing device 1002 could be used to perform any of the methods or functions described above.

The processing device 1002 represents one or more general-purpose processing devices, such as a microprocessor, central processing unit (CPU), or the like. More particularly, the processing device 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1002 is configured to execute processing logic in instructions for performing the operations and steps discussed herein.

The various illustrative logical blocks, modules, and circuits described in connection with the embodiments disclosed herein may be implemented or performed with the processing device 1002, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 1002 may be a microprocessor, or may be any conventional processor, controller, microcontroller, or state machine. The processing device 1002 may also be implemented as a combination of computing devices (e.g., a combination of a DSP and a microprocessor, a plurality of microprocessors, one or more microprocessors in conjunction with a DSP core, or any other such configuration).

The computer system 1000 may further include a network interface device 1010. The computer system 1000 also may or may not include an input 1012, configured to receive input and selections to be communicated to the computer system 1000 when executing instructions. The input 1012 may include, but not be limited to, a touch sensor (e.g., a touch display), an alphanumeric input device (e.g., a keyboard), and/or a cursor control device (e.g., a mouse). In an exemplary aspect, the RF transceiver 24 of FIG. 2 is an input 1012 to the computer system 1000. The computer system 1000 also may or may not include an output 1014, including but not limited to a display, a video display unit (e.g., a liquid crystal display (LCD) or a cathode ray tube (CRT)), or a printer. In some examples, some or all inputs 1012 and outputs 1014 may be combination input/output devices. In an exemplary aspect, the RF transceiver 24 of FIG. 2 is also an output 1014 of the computer system 1000.

The computer system 1000 may or may not include a data storage device that includes instructions 1016 stored in a computer-readable medium 1018. The instructions 1016 may also reside, completely or at least partially, within the main memory 1004 and/or within the processing device 1002 during execution thereof by the computer system 1000, the main memory 1004, and the processing device 1002 also constituting computer-readable medium. The instructions 1016 may further be transmitted or received via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions 1016. The term "computer-readable medium" shall also be taken to include any medium that is capable of storing, encoding, or carrying a set of instructions for execution by the processing device 1002 and that causes the processing device 1002 to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for estimating position information in a distributed radio frequency (RF) communications system, the method comprising:
    receiving a first RF receive signal comprising a data payload having at least one frame, wherein the data payload indicates a transmit time stamp of the first RF receive signal and a frame length of the at least one frame and a first positioning sequence from a first network node at a second network node;
    estimating a first time of arrival (ToA) of the first positioning sequence at the second network node;
    estimating relative positional information of the second network node from the first network node based on the first ToA, the frame length of the at least one frame, a perceived frame length of the at least one frame, the transmit time stamp of the RF receive signal, and a perceived time stamp of the RF receive signal; and
    transmitting a first RF transmit signal comprising the estimated first ToA.

2. The method of claim 1, wherein:
    the first RF receive signal is received over a RF band; and
    the first RF transmit signal is transmitted over the RF band.

3. The method of claim 2, wherein:
    the first RF receive signal is formatted as a joint positioning-communications waveform; and
    the first RF transmit signal is formatted as the joint positioning-communications waveform.

4. The method of claim 3, wherein:
    the first RF receive signal is received during a first time slot of the joint positioning-communications waveform; and
    the first RF transmit signal is transmitted during a second time slot of the joint positioning-communications waveform.

5. The method of claim 4, wherein the first time slot and the second time slot are predetermined.

6. The method of claim 4, wherein the first time slot and the second time slot are randomly selected.

7. The method of claim 1, wherein the relative positional information comprises a relative range of the first network node.

8. The method of claim 7, further comprising:
    receiving a second RF receive signal comprising a second positioning sequence from the first network node at a second antenna;
    receiving a third RF receive signal comprising a third positioning sequence from the first network node at a third antenna;
    estimating a second ToA of the second positioning sequence;
    estimating a third ToA of the third positioning sequence; and
    determining a relative position of the first network node from the estimated first ToA, the estimated second ToA, and the estimated third ToA.

9. The method of claim 8, further comprising:
    receiving a fourth RF receive signal comprising a fourth positioning sequence from the first network node at a fourth antenna;
    estimating a fourth ToA of the fourth positioning sequence;
    determining a relative position and orientation of the first network node from the estimated first ToA, the estimated second ToA, the estimated third ToA, and the estimated fourth ToA.

10. The method of claim 1, further comprising:
    receiving a second RF receive signal comprising an estimated second ToA from the first network node;
    correcting the estimated relative positional information of the first network node based on the estimated second ToA.

11. The method of claim 1, wherein transmitting the first RF transmit signal comprises transmitting a first transmit positioning sequence from a first antenna.

12. The method of claim 11, further comprising:
    transmitting a second RF transmit signal comprising a second transmit positioning sequence from a second antenna; and
    transmitting a third RF transmit signal comprising a third transmit positioning sequence from a third antenna.

13. The method of claim 12, further comprising transmitting a fourth RF transmit signal comprising a fourth transmit positioning sequence from a fourth antenna.

14. The method of claim 12, wherein the first RF transmit signal, the second RF transmit signal, and the third RF transmit signal comprise a joint positioning-communications waveform.

15. The method of claim 14, wherein the first RF transmit signal comprises a data payload of the joint positioning-communications waveform.

16. The method of claim 15, wherein the data payload comprises clock synchronization information.

17. The method of claim 14, wherein the second RF transmit signal and the third RF transmit signal do not comprise any data payload of the joint positioning-communications waveform.

18. The method of claim 1, further comprising:
    receiving a second RF receive signal comprising a second positioning sequence from a second network node;
    estimating a second ToA of the second positioning sequence; and estimating relative positional information of the first network node and the second network node from the estimated first ToA and the estimated second ToA.

19. The method of claim 18, wherein:

the first RF receive signal, the second RF receive signal, and the first RF transmit signal use a joint positioning-communications waveform over a RF band; and each of the first RF receive signal, the second RF receive signal, and the first RF transmit signal is received during an allocated time slot of the joint positioning-communications waveform.

20. A radio frequency (RF) device, comprising:

an RF transceiver;

a signal processor coupled to the RF transceiver and configured to:

receive, from the RF transceiver, a first RF receive signal comprising a data payload having at least one frame, wherein the data payload indicates a transmit time stamp of the first RF receive signal and a frame length of the at least one frame and a first positioning sequence from a first network node at the RF device;

estimate a first time of arrival (ToA) of the first positioning sequence at the RF device;

estimate relative positional information of the RF device from the first network node based on the first ToA, the frame length of the at least one frame, a perceived frame length of the at least one frame, the transmit time stamp of the RF receive signal, and a perceived time stamp of the RF receive signal; and cause the RF transceiver to transmit a first RF transmit signal comprising the estimated first ToA.

21. The RF device of claim 20, further comprising a plurality of antennas coupled to the RF transceiver;

wherein the first RF transmit signal is transmitted from a first antenna of the plurality of antennas and comprises a first transmit positioning sequence.

22. The RF device of claim 21, wherein the signal processor is further configured to:

cause the RF transceiver to transmit a second RF transmit signal comprising a second transmit positioning sequence from a second antenna of the plurality of antennas;

cause the RF transceiver to transmit a third RF transmit signal comprising a third transmit positioning sequence from a third antenna of the plurality of antennas; and cause the RF transceiver to transmit a fourth RF transmit signal comprising a fourth transmit positioning sequence from a fourth antenna of the plurality of antennas.

23. The RF device of claim 21, wherein the plurality of antennas is distributed to reduce one or more of ground bounce or multi-path interference of RF signals transmitted or received by the RF device.

24. A distributed radio frequency (RF) communications system, comprising:

a first RF device, comprising:

a first RF transceiver; and a first signal processor coupled to the first RF transceiver, the first signal processor configured to:

receive, from the first RF transceiver, a first RF signal of a joint positioning-communications waveform originating from a second RF device wherein the first RF signal comprises a data payload having at least one frame, wherein the data payload indicates a transmit time stamp of the first RF receive signal and a frame length of the at least one frame and a first positioning sequence of a first network node from a network node at the first RF device;

estimate time of arrival (ToA) information derived from the minimum shift keying sequence of the first RF signal at the first RF device;

estimate relative positional information of the first RF device from the second RF device based on the estimated ToA information, the frame length of the at least one frame, a perceived frame length of the at least one frame, the transmit time stamp of a RF receive signal, and a perceived time stamp of the RF receive signal; and cause the first RF transceiver to transmit a second RF signal of the joint positioning-communications waveform, the second RF signal comprising the estimated ToA information and a first positioning sequence of the first RF device.

25. The distributed RF communications system of claim 24, further comprising the second RF device, comprising:

a second RF transceiver; and a second signal processor coupled to the second RF transceiver, the second signal processor configured to:

receive, from the second RF transceiver, the second RF signal of the joint positioning-communications waveform;

estimate a first ToA of the first positioning sequence; and estimate a relative range of the first RF device and the second RF device from the estimated first ToA and the estimated ToA information.

26. The distributed RF communications system of claim 24, further comprising a plurality of network nodes configured to exchange the joint-positioning communications waveform with the first RF device.

* * * * *